(12) United States Patent
Talbot et al.

(10) Patent No.: US 12,389,137 B2
(45) Date of Patent: Aug. 12, 2025

(54) IMAGE SENSORS WITH MULTIPLE COLUMN OUTPUT LINES PER COLUMN

(71) Applicant: SEMICONDUCTOR COMPONENTS INDUSTRIES, LLC, Phoenix, AZ (US)

(72) Inventors: Andrew David Talbot, Chieveley (GB); Stephen James Spinks, Shrivenham (GB); Nicholas Paul Cowley, Wroughton (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 269 days.

(21) Appl. No.: 18/062,130

(22) Filed: Dec. 6, 2022

(65) Prior Publication Data

US 2024/0187755 A1 Jun. 6, 2024

(51) Int. Cl.
*H04N 25/767* (2023.01)
*H04N 25/772* (2023.01)
*H04N 25/78* (2023.01)

(52) U.S. Cl.
CPC ......... *H04N 25/767* (2023.01); *H04N 25/772* (2023.01); *H04N 25/78* (2023.01)

(58) Field of Classification Search
None
See application file for complete search history.

(56) References Cited

U.S. PATENT DOCUMENTS

| | | | |
|---|---|---|---|
| 9,336,742 B2 | 5/2016 | Ahn et al. | |
| 9,344,635 B2 | 5/2016 | Vogelsang et al. | |
| 10,277,843 B2 | 4/2019 | Smith et al. | |
| 2010/0091128 A1* | 4/2010 | Ogasawara | H04N 25/767 348/222.1 |
| 2014/0293102 A1* | 10/2014 | Vogelsang | H04N 23/741 348/294 |
| 2016/0381311 A1* | 12/2016 | Guo | H04N 25/78 348/308 |
| 2017/0243566 A1 | 8/2017 | Nakai | |

(Continued)

OTHER PUBLICATIONS

"Logic Level & Noise Margin", VLSI Concepts, Feb. 9, 2018, 8 pages. (Year: 2018).*

*Primary Examiner* — Mark T Monk
(74) *Attorney, Agent, or Firm* — Treyz Law Group, P.C.; Joseph F. Guihan (57) ABSTRACT

An image sensor may include an array of imaging pixels arranged in rows and columns. Each column of imaging pixels may include a respective plurality of column output lines. Each column output line may be coupled to a respective subset of the imaging pixels in that column of imaging pixels. Each plurality of column output lines for a given column may be coupled to readout circuitry. Each group of column output lines may share a single respective sample and hold circuit and a single respective analog-to-digital converter. Alternatively, each group of column output lines may have one sample and hold circuit per column output line and each group of column output lines may share a single respective analog-to-digital converter. Alternatively, each group of column output lines may have one sample and hold circuit per column output line and may have one analog-to-digital converter per column output line.

20 Claims, 11 Drawing Sheets

(56) References Cited

U.S. PATENT DOCUMENTS

2021/0160443 A1\* 5/2021 Okada .................. H04N 25/772
2021/0243389 A1\* 8/2021 Sawada ................. G01T 1/2921
2022/0232178 A1\* 7/2022 Iwahara ................ H04N 25/78
2022/0264051 A1\* 8/2022 Etou .................... H03M 1/1225

\* cited by examiner

IMAGE SENSORS WITH MULTIPLE COLUMN OUTPUT LINES PER COLUMN

BACKGROUND

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

In conventional image sensors, reading out image signals from a column of image pixels may take more time than desired, limiting the maximum possible frame rate for the image sensor.

It is within this context that the embodiments described herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
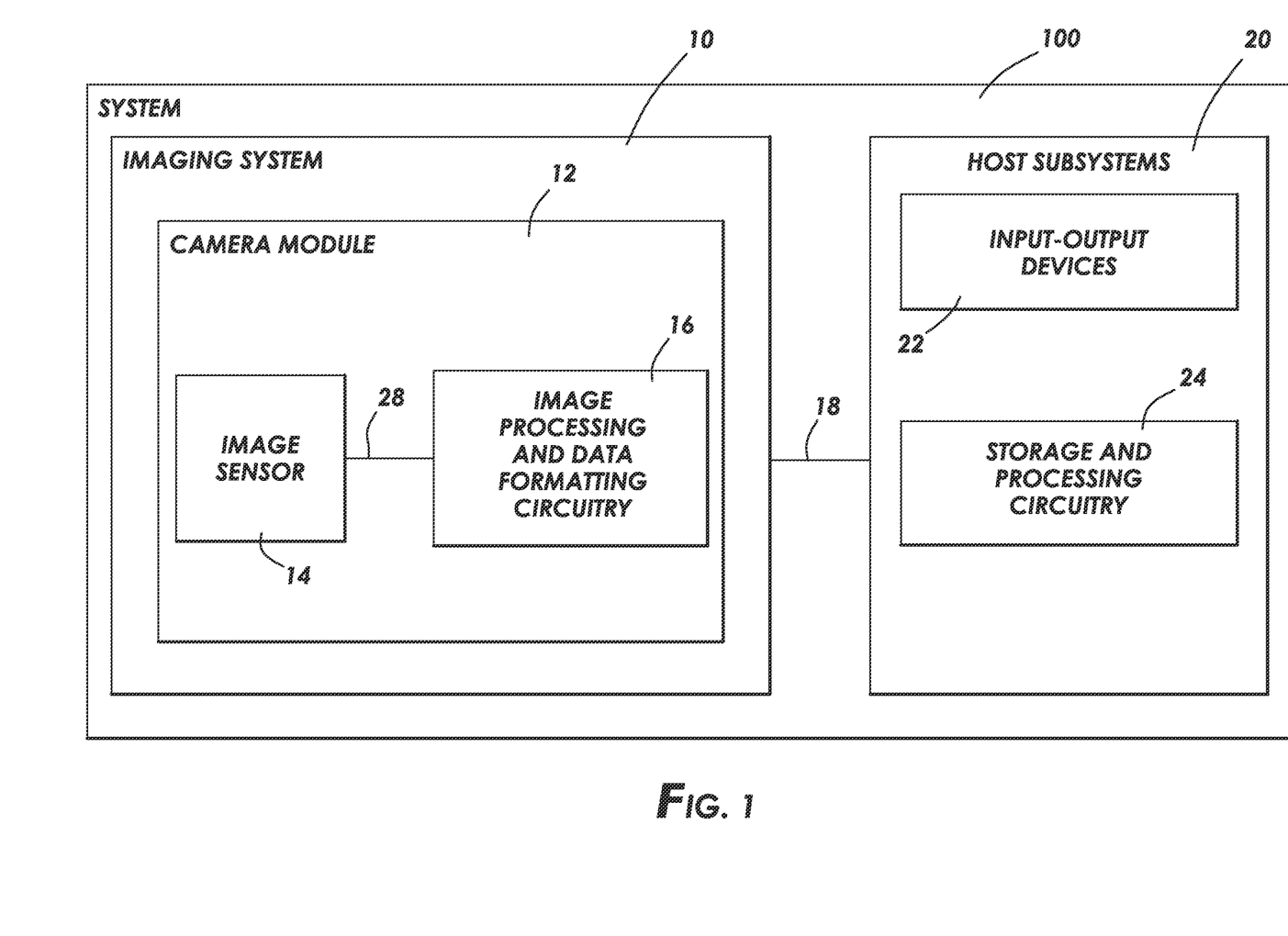
FIG. 1 is a diagram of an illustrative electronic device having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses.

During image capture operations, each lens may focus light onto an associated image sensor 14. Image sensor 14 may include photosensitive elements (i.e., image sensor pixels) that convert the light into analog data. Image sensors may have any number of pixels (e.g., hundreds, thousands, millions, or more). A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), and/or address circuitry.

Still and video image data from sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that have been stacked.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
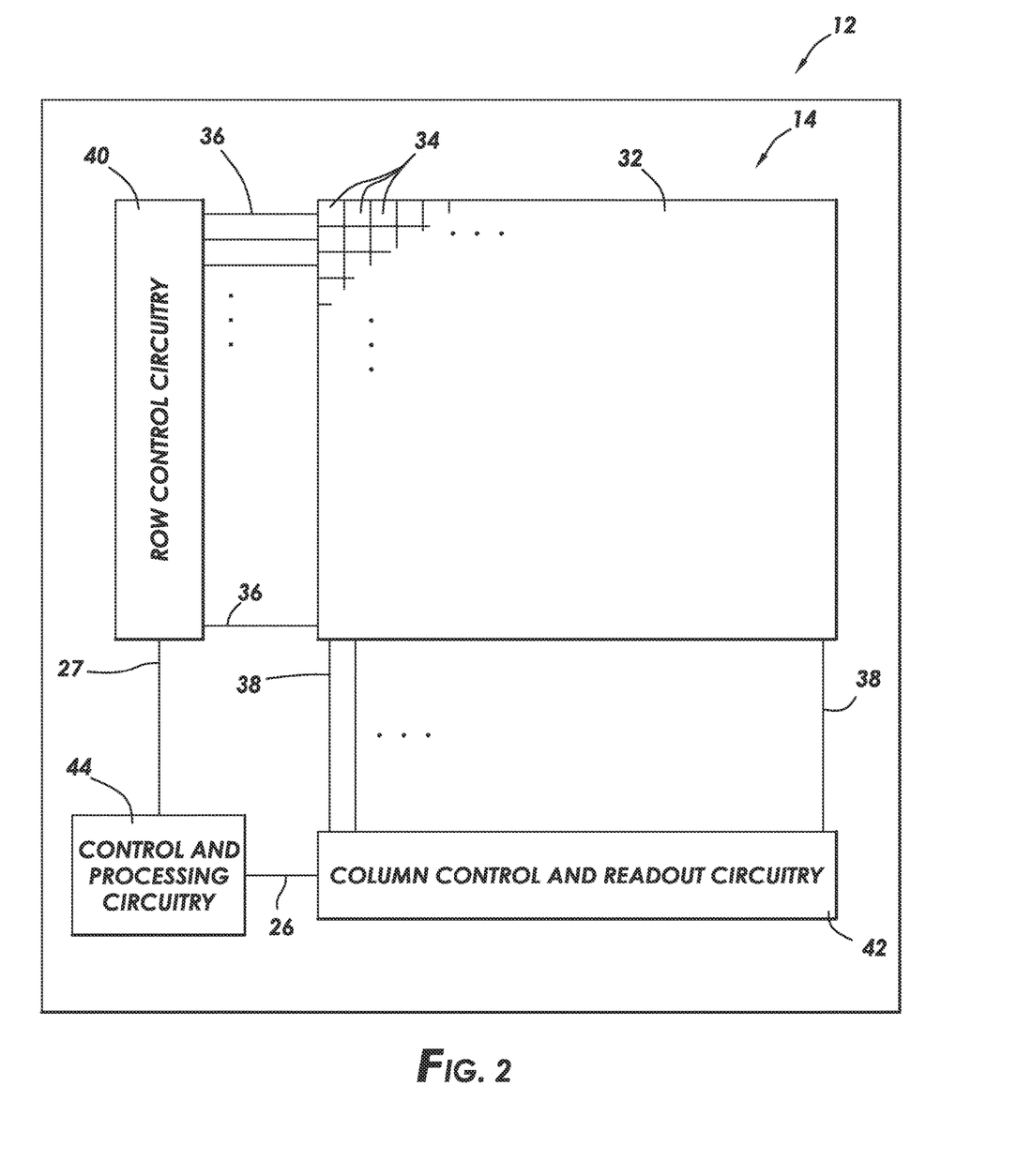
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may be part of image processing and data formatting circuitry 16 in FIG. 1 or may be separate from circuitry 16. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38. For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, or column memory for storing the readout signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements, yellow color filter elements, etc.) may be used instead of green pixels in a Bayer pattern. These examples are merely illustrative and, in general, color filter elements of any desired color and in any desired pattern may be formed over any desired number of image pixels 34.

In some implementations, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be any other node along the pixel circuit. In one alternative, the desired node split across two dies may be the node between a floating diffusion region and the gate of a source follower transistor. For example, the floating diffusion node may be formed on the first die on which the photodiode is formed, while the coupling structure may connect the floating diffusion node to the source follower transistor on the second die. In another alternative, the desired node split across two dies may be the node between a floating diffusion region and a source-drain node of a transfer transistor. For example, the floating diffusion node may be formed on the second die on which the photodiode is not located. In yet another alternative, the desired node split across two dies may be the node between a source-drain node of a source follower transistor and a row select transistor.

In general, array 32, row control circuitry 40, and column control and readout circuitry 42 may be split between two or more stacked substrates. In one example, array 32 may be formed in a first substrate and row control circuitry 40 and column control and readout circuitry 42 may be formed in a second substrate. In another example, array 32 may be split between first and second substrates (using one of the pixel splitting schemes described above) and row control circuitry 40 and column control and readout circuitry 42 may be formed in a third substrate. In other examples, row control circuitry 40 may be on a separate substrate from column control and readout circuitry 42. In yet another example, row control circuitry 40 may be split between two or more substrates and/or column control and readout circuitry 42 may be split between two or more substrates.

Figure 3:
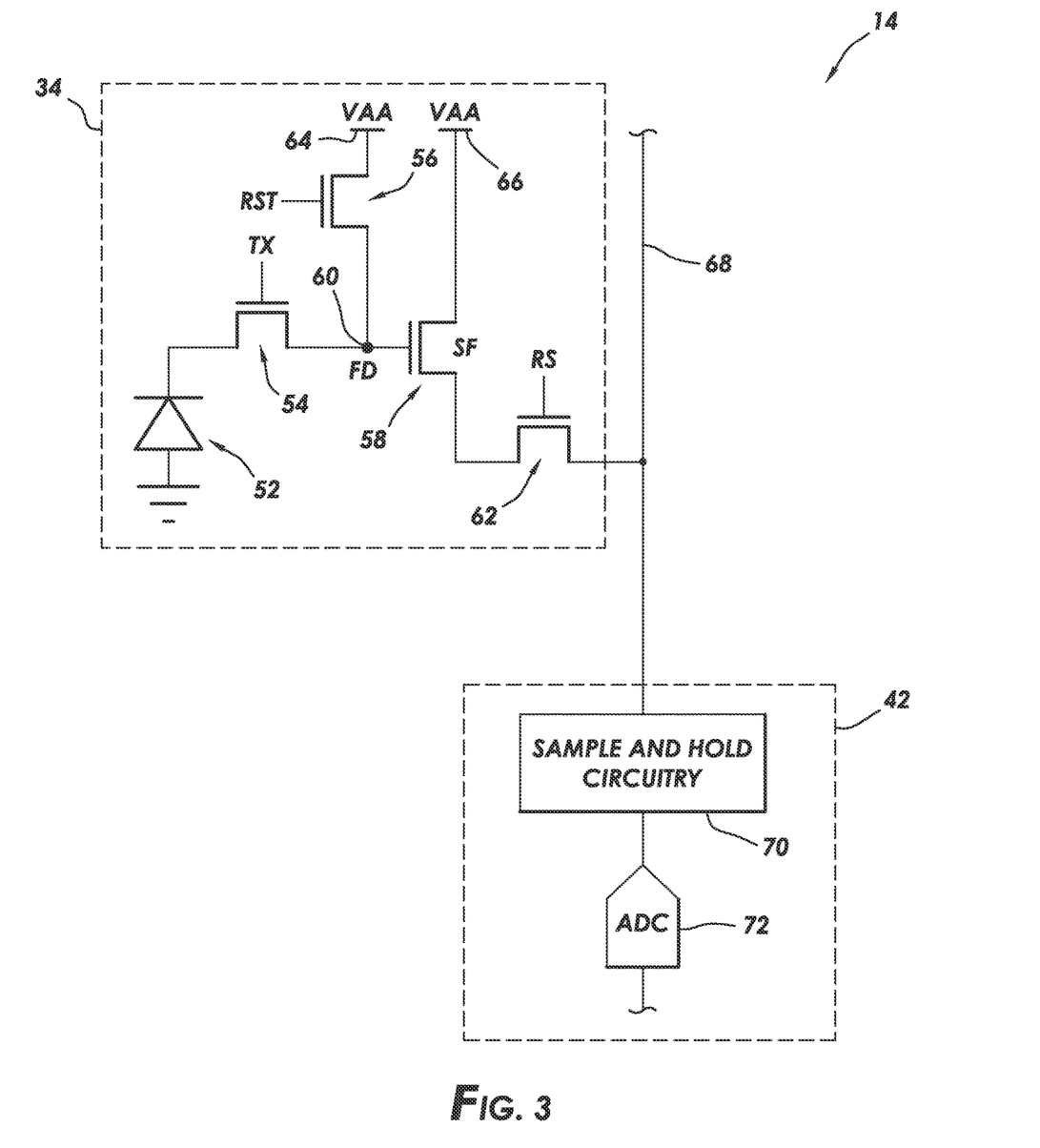
FIG. 3 is a diagram of an illustrative image sensor with an imaging pixel connected to readout circuitry in accordance with some embodiments.

FIG. 3 is a schematic diagram of an illustrative image sensor where each column of imaging pixels has an associated single column output line. FIG. 3 shows a pixel 34 that includes a photodiode 52 and a floating diffusion region 60. A transfer transistor 54 is interposed between the photodiode and the floating diffusion region. Charge may be transferred from photodiode 52 to floating diffusion region 60 when transfer transistor 54 is asserted. A source follower transistor 58 has a gate that is coupled to the floating diffusion region 60. A reset transistor 56 may be coupled between the floating diffusion region 60 and a voltage supply 64. Source follower transistor 58 may be coupled between a voltage supply 66 and a row select transistor 62. Row select transistor 62 may be coupled to a column output line 68.

The arrangement of imaging pixel 34 shown in FIG. 3 is merely illustrative. In general, imaging pixel 34 may have any desired arrangement. Additional transistors such as overflow transistors, antiblooming transistors, and/or dual conversion gain transistors, may be included imaging pixel 34 if desired. Additional charge storage regions such as photodiodes and/or capacitors may be included imaging pixel 34 if desired.

Column output line 68 is coupled to sample and hold circuitry 70 (sometimes referred to as a sample and hold circuit 70). During sampling operations, row select transistor 62 may be asserted and a voltage correlated to the charge on floating diffusion region 60 is provided to column output line 68. The voltage on column output line 68 may be stored by sample and hold circuitry 70. The stored voltage may then be converted to a digital value by analog-to-digital converter (ADC) 72. The value from ADC may be provided to additional downstream processing circuitry. As shown in FIG. 3, sample and hold circuitry 70 and ADC 72 are part of column control and readout circuitry 42 (e.g., as shown in FIG. 2). Sample and hold circuitry 70 and ADC 72 may sometimes be referred to as readout circuitry, a readout circuit, or a readout path.

Some image sensors may have a large number of rows of pixels. For example, image sensor 14 may include more than 1,000 rows, more than 4,000 rows, more than 8,000 rows, more than 10,000 rows, etc. Column output lines have an associated settling time. The settling time is equal to the duration of time for the output voltage to stabilize at a near constant voltage (e.g., when row select transistor 62 is asserted). The settling time may be positively correlated with the load seen by the source follower in a given pixel. As the number of rows of pixels in a pixel array increases, the length of the column output line increases, causing the load seen by the source follower in a given pixel to increase, which therefore causes the settling time of the column output line to increase.

The increased settling time may prevent the image sensor from having frame rates as high as desired. Consider an example where the settling time is 6 microseconds and the processing of the voltage on the column output line by sample and hold circuitry 70 and ADC 72 takes 2 microseconds. The total duration of time for reading each row of pixels is therefore 8 microseconds. The total duration of time for reading a column of pixels is therefore 8 microseconds multiplied by the number of rows in the array. As the number of rows in the array becomes larger, the total readout time for the array increases, limiting the possible frame rate.

In some arrangements the processing of the voltage on the column output line by sample and hold circuitry 70 and ADC 72 may be pipelined with the column path settling. In other words, when row N is being processed by the sample and hold circuitry 70 and ADC 72 the column path may be settling to value for row N+1. In this arrangement the example row time is 6 microsecond and again as the number of rows in the array becomes larger, the total readout time for the array increases, limiting the possible frame rate.

In both the examples above the time associated with processing is significantly shorter than the column settling time.

Figure 4:
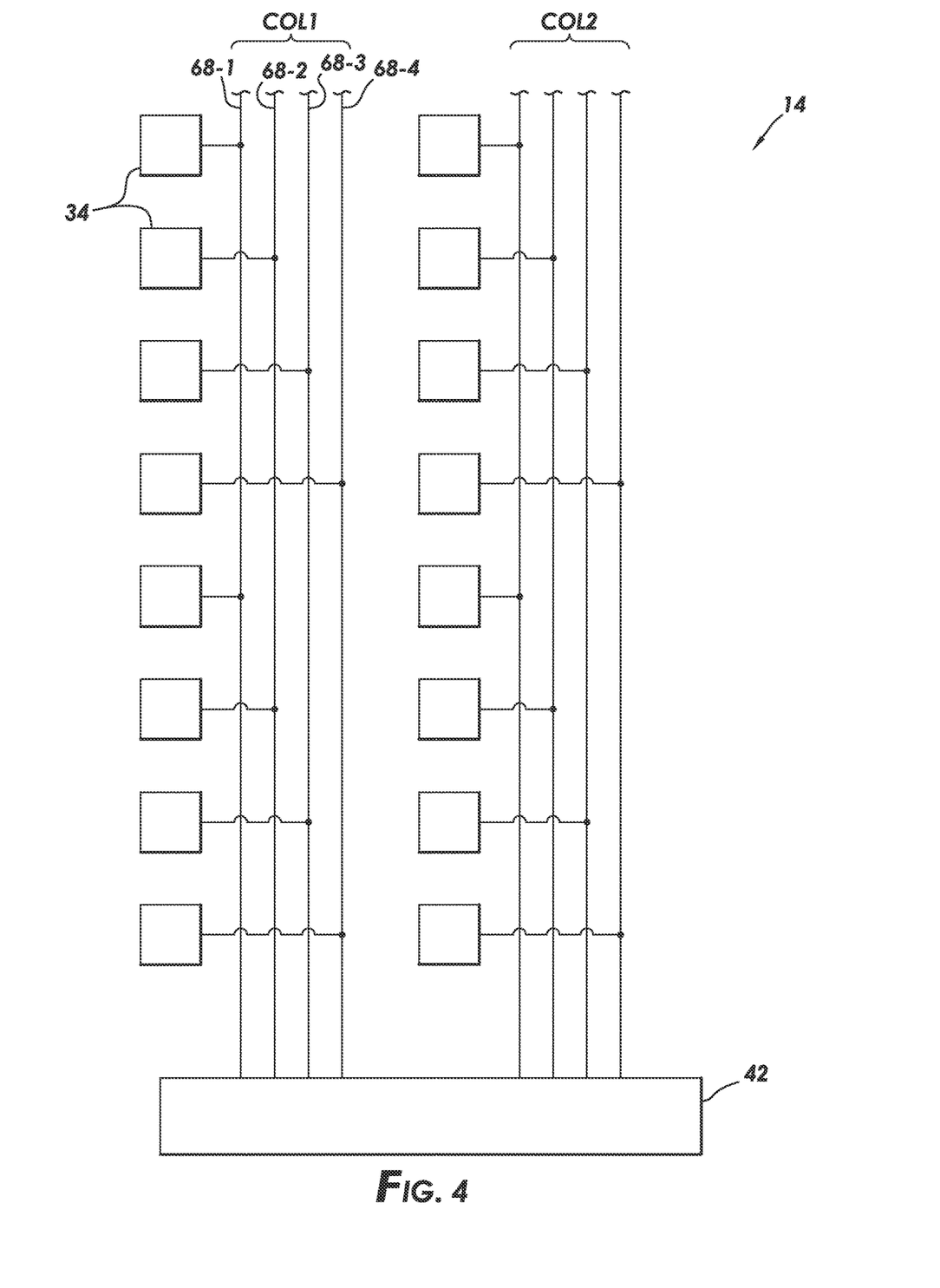
FIG. 4 is a diagram of an illustrative image sensor with multiple column output lines for each column of imaging pixels in accordance with some embodiments.

To reduce the readout time of a column of imaging pixels and therefore enable higher frame rates, multiple column output lines may be included for a single column of imaging pixels. FIG. 4 is a schematic diagram showing an image sensor of this type.

FIG. 4 shows two columns of imaging pixels 34. Each column of imaging pixels includes a respective group of column output lines. In particular, each column of imaging pixels includes four associated column output lines 68-1, 68-2, 68-3, and 68-4. Column output line 68-1 is coupled to every fourth row in the array, starting with the first row (e.g., the first row, the fifth row, the ninth row, etc.). Column output line 68-2 is coupled to every fourth row in the array, starting with the second row (e.g., the second row, the sixth row, the tenth row, etc.). Column output line 68-3 is coupled to every fourth row in the array, starting with the third row (e.g., the third row, the seventh row, the eleventh row, etc.). Column output line 68-4 is coupled to every fourth row in the array, starting with the fourth row (e.g., the fourth row, the eight row, the twelfth row, etc.). In other words, the column output lines in a given group of column output lines are coupled to the pixels in an alternating manner.

Each one of the four column output lines in a given column is coupled to column control and readout circuitry 42. There are several possible arrangements for the readout circuitry associated with a given group of column output lines in a single column.

Figure 5:
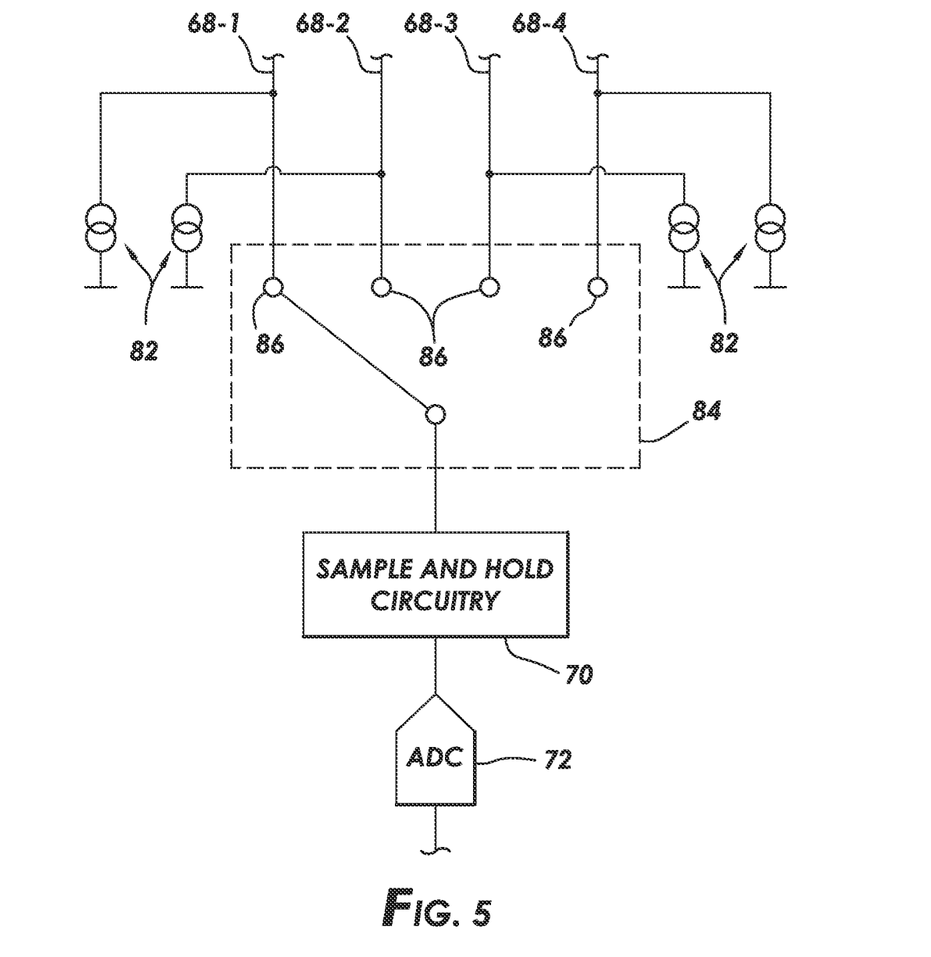
FIG. 5 is a diagram of an illustrative image sensor where a group of column output lines for a single column of imaging pixels shares a single sample and hold circuit and a single analog-to-digital converter in accordance with some embodiments.

FIG. 5 is a schematic diagram of possible readout circuitry for a group of column output lines in a single column. As shown in FIG. 5, each one of column output lines 68-1, 68-2, 68-3, and 68-4 has a corresponding current source 82. Each column output line is also coupled to a respective terminal 86 in multiplexer 84 (sometimes referred to as switching circuitry or multiplexer circuitry). The multiplexer 84 may selectively couple one of the column output lines 68-1, 68-2, 68-3, and 68-4 to sample and hold circuitry 70. Sample and hold circuitry 70 is coupled to ADC 72 (similar to as described in connection with FIG. 3).

Multiplexer 84 is operable in a first state in which column output line 68-1 is coupled to sample and hold circuitry 70, a second state in which column output line 68-2 is coupled to sample and hold circuitry 70, a third state in which column output line 68-3 is coupled to sample and hold circuitry 70, and a fourth state in which column output line 68-4 is coupled to sample and hold circuitry 70.

In the arrangement of FIG. 5, column output lines 68-1, 68-2, 68-3, and 68-4 share sample and hold circuitry 70 and ADC 72. Because only one sample and hold circuit 70 and ADC 72 are included for the given column, power consumption is minimized. Additionally, the speed of the readout may be increased.

In FIG. 5, the settling time for each column output line may again be 6 microseconds (similar to the example above). However, because there are four column output lines for a single column, the settling times for each one of the four column output lines may occur in parallel. In other words, 6 total microseconds are used for the settling time of four column output lines. After the settling time is complete, the signals may be read by sample and hold circuitry 70 and ADC 72 serially (e.g., in 2 microseconds each). In this example, it therefore takes 8 total microseconds for the processing of the voltages on the column output lines by sample and hold circuitry 70 and ADC 72. The total time to read the four rows of pixels in FIG. 5 is therefore 14 microseconds, resulting in an average read time per row of 3.5 microseconds (compared to the examples in FIG. 3 without the multiple column output lines per column which require 6 microseconds or 8 microseconds for read time per row).

In some image sensors, it may be desirable to read multiple samples from a single row of pixels. For example, each pixel may have a reset sample and a signal sample for a correlated double sampling operation (e.g., where the reset sample is subtracted from the signal sample to reduce noise).

Figure 6:
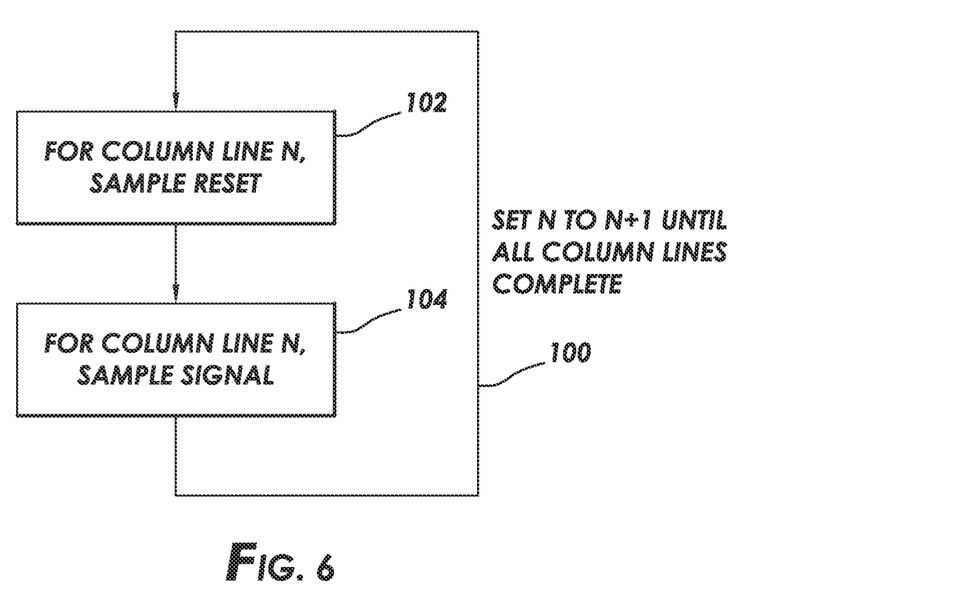
FIGS. 6 and 7 are flowcharts of illustrative method steps that may be used to operate an image sensor of the type shown in FIG. 5 in accordance with some embodiments.

FIG. 6 shows an illustrative method of operating an image sensor of the type shown in FIG. 5. As shown, at step 102, the reset sample may be sampled from column line n (within the multiple column output lines in a given group of column output lines). For example, multiplexer 84 may connect column output line 68-1 to sample and hold circuitry 70. The voltage on column output line 68-1 (associated with the reset sample) is then sampled by sample and hold circuitry 70 and ADC 72. After the aforementioned operation is complete, the signal sample may be sampled from column line n at step 104. Multiplexer 84 may continue to connect column output line 68-1 to sample and hold circuitry 70. The voltage on column output line 68-1 (associated with the signal sample) is then sampled by sample and hold circuitry 70 and ADC 72.

After steps 102 and 104 are complete, n may be set equal to n+1 and this process may be repeated as shown by loop 100. In other words, n is changed from 1 to 2 and the method continues at step 102 using the next column output line in the group of column output lines. Multiplexer 84 may connect column output line 68-2 to sample and hold circuitry 70. The voltage on column output line 68-2 (associated with the reset sample) is then sampled by sample and hold circuitry 70 and ADC 72. After the aforementioned operation is complete, the signal sample may be sampled from column line n at step 104. Returning to FIG. 5, multiplexer 84 may continue to connect column output line 68-2 to sample and hold circuitry 70. The voltage on column output line 68-2 (associated with the signal sample) is then sampled by sample and hold circuitry 70 and ADC 72. Steps 102 and 104 are thereafter repeated for column output lines 68-3 and 68-4. Once the signals from all of the column output lines in a single column are processed, the method of FIG. 6 may be repeated for subsequent groups of four rows of imaging pixels until the entire array of imaging pixels has been read.

Figure 7:
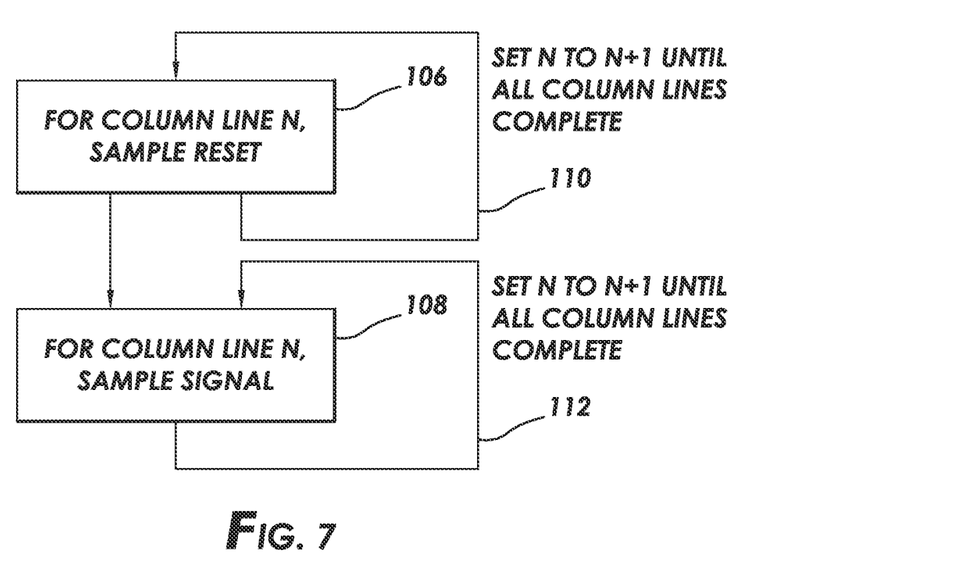

FIG. 7 shows an alternative method of operating an image sensor of the type shown in FIG. 5. As shown, at step 106, the reset sample may be sampled from column line n. Multiplexer 84 may connect column output line 68-1 to sample and hold circuitry 70. The voltage on column output line 68-1 (associated with the reset sample) is then sampled by sample and hold circuitry 70 and ADC 72. After step 106 is complete, n may be set equal to n+1 and this process may be repeated as shown by loop 110. In other words, n is changed from 1 to 2 and the method continues at step 106. Multiplexer 84 may connect column output line 68-2 to sample and hold circuitry 70. The voltage on column output line 68-2 (associated with the reset sample) is then sampled by sample and hold circuitry 70 and ADC 72. Step 106 is thereafter repeated for column output lines 68-3 and 68-4. Once the reset samples from all of the column output lines in a single column are processed, the method of FIG. 7 may continue to step 108.

At step 108, the signal sample may be sampled from column line n. Multiplexer 84 may connect column output line 68-1 to sample and hold circuitry 70. The voltage on column output line 68-1 (associated with the signal sample) is then sampled by sample and hold circuitry 70 and ADC 72. After step 108 is complete, n may be set equal to n+1 and this process may be repeated as shown by loop 112. In other words, n is changed from 1 to 2 and the method continues at step 108. Multiplexer 84 may connect column output line 68-2 to sample and hold circuitry 70. The voltage on column output line 68-2 (associated with the signal sample) is then sampled by sample and hold circuitry 70 and ADC 72. Step 108 is thereafter repeated for column output lines 68-3 and 68-4. Once the signal samples from all of the column output lines in a single column are processed, the method of FIG. 7 may be repeated for subsequent groups of four rows of imaging pixels until the entire array of imaging pixels has been read.

Figure 8:
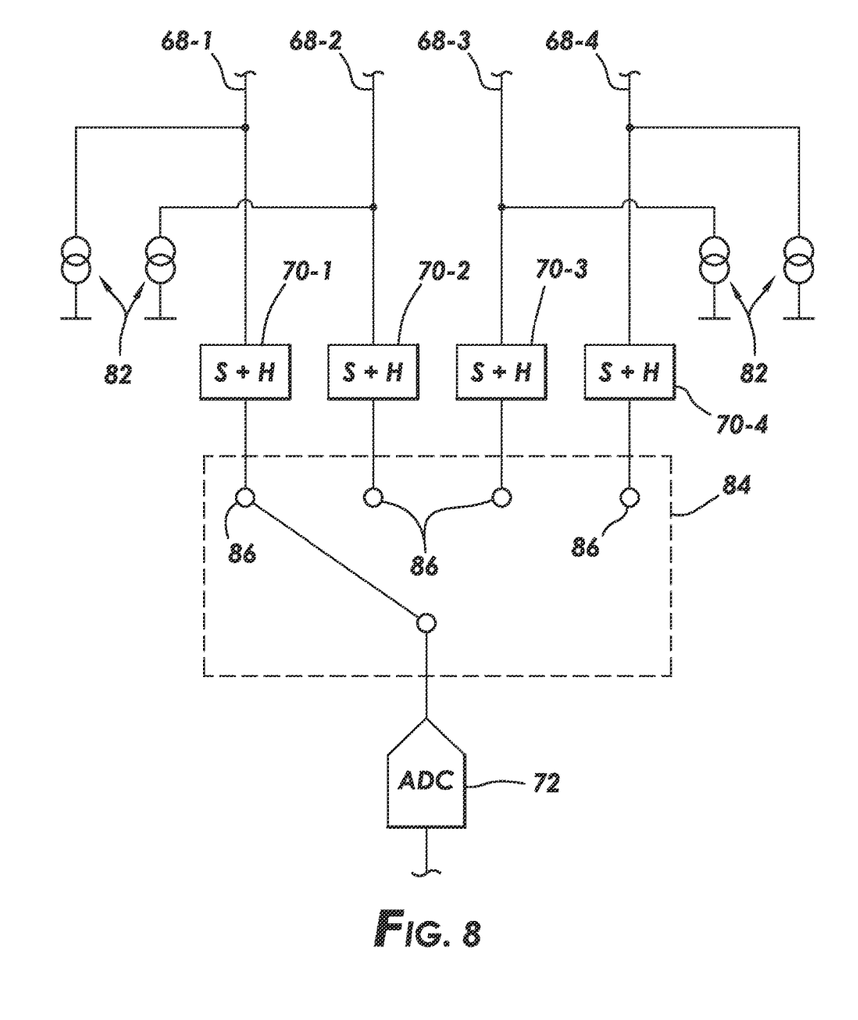
FIG. 8 is a diagram of an illustrative image sensor where a group of column output lines for a single column of imaging pixels has one sample and hold circuit per column output line and shares a single analog-to-digital converter in accordance with some embodiments.

In another possible arrangement, shown in FIG. 8, each column output line in a group of column output lines for a single column of imaging pixels has dedicated sample and hold circuitry. Column output line 68-1 is connected to sample and hold circuitry 70-1, column output line 68-2 is connected to sample and hold circuitry 70-2, column output line 68-3 is connected to sample and hold circuitry 70-3, and column output line 68-4 is connected to sample and hold circuitry 70-4.

Each sample and hold circuit is coupled to a respective terminal 86 in multiplexer 84 (sometimes referred to as switching circuitry or multiplexer circuitry). The multiplexer 84 may selectively couple one of sample and hold circuits 70-1, 70-2, 70-3, and 70-4 to ADC 72.

Multiplexer 84 is operable in a first state in which sample and hold circuit 70-1 is coupled to ADC 72, a second state in which sample and hold circuit 70-2 is coupled to ADC 72, a third state in which sample and hold circuit 70-3 is coupled to ADC 72, and a fourth state in which sample and hold circuit 70-4 is coupled to ADC 72.

The arrangement of FIG. 8 may afford additional speed improvements relative to the arrangement of FIG. 5. Consider an example where the sample and hold operations performed by sample and hold circuitry 70 take 1 microsecond and the operations performed by ADC 72 take 1 microsecond. The total readout time for the four column output lines in this example may be 11 microseconds (6 microseconds for parallel settling in the four column output lines, 1 microsecond for parallel sample and hold operations for the four column output lines, and 4 microseconds for 4 serial ADC operations), or 2.75 microseconds per row.

Figure 9:
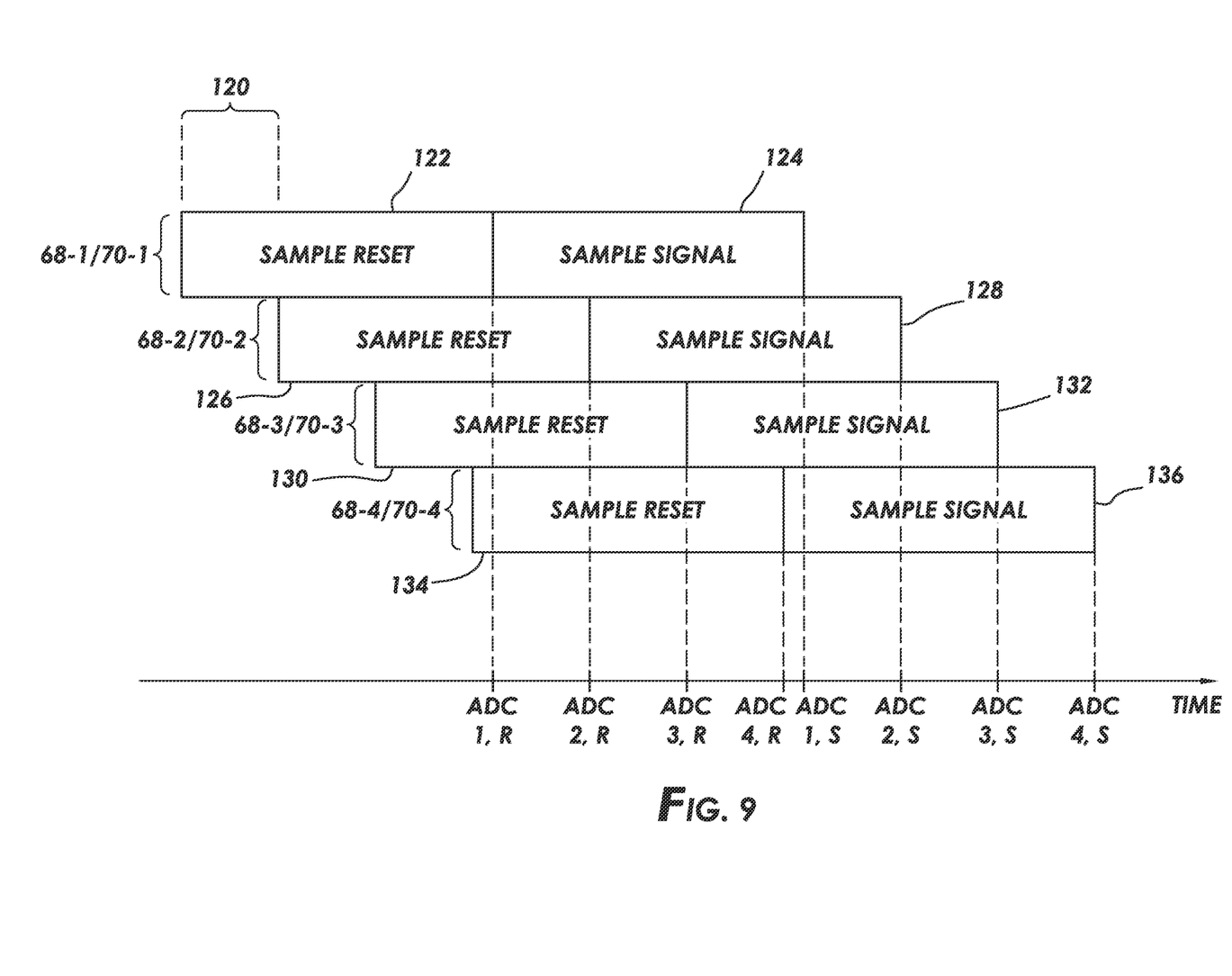
FIG. 9 is a timing diagram showing illustrative method steps that may be used to operate an image sensor of the type shown in FIG. 8 in accordance with some embodiments.

If desired, the image sensor of FIG. 8 may be used for a pipeline operation that is shown in FIG. 9. As shown, column output line 68-1 and associated sample and hold circuitry 70-1 may sample a reset sample (at operation 122) and then sample a signal sample (at operation 124). At a delay 120 from the start of operation 122, column output line 68-2 and associated sample and hold circuitry 70-2 may sample a reset sample (at operation 126) and then sample a signal sample (at operation 128). After another delay, column output line 68-3 and associated sample and hold circuitry 70-3 may sample a reset sample (at operation 130) and then sample a signal sample (at operation 132). After another delay, column output line 68-4 and associated sample and hold circuitry 70-4 may sample a reset sample (at operation 134) and then sample a signal sample (at operation 136).

There is therefore parallel sampling across the four column output lines in a given column. The ADC may perform operations serially when the sampling operations are completed. As shown in the diagram of FIG. 9, the ADC may convert the reset sample from column output line 68-1 after operation 122 is completed, then convert the reset sample from column output line 68-2 after operation 126 is completed, then convert the reset sample from column output line 68-3 after operation 130 is completed, then convert the reset sample from column output line 68-4 after operation 134 is completed, then convert the signal sample from column output line 68-1 after operation 124 is completed, then convert the signal sample from column output line 68-2 after operation 128 is completed, then convert the signal sample from column output line 68-3 after operation 132 is completed, then convert the signal sample from column output line 68-4 after operation 136 is completed.

The delay 120 should be greater by factor Δt than the time associated with the processing of the voltage on the column output line by sample and hold circuitry 70 and ADC 72, in which case the total readout time for the four column output lines in this example may be substantially (8+4*Δt) microseconds or (2+Δt) microseconds per row. At should be substantially close to 0 so resulting in a row time that is substantially close to 2 microseconds.

Figure 10:
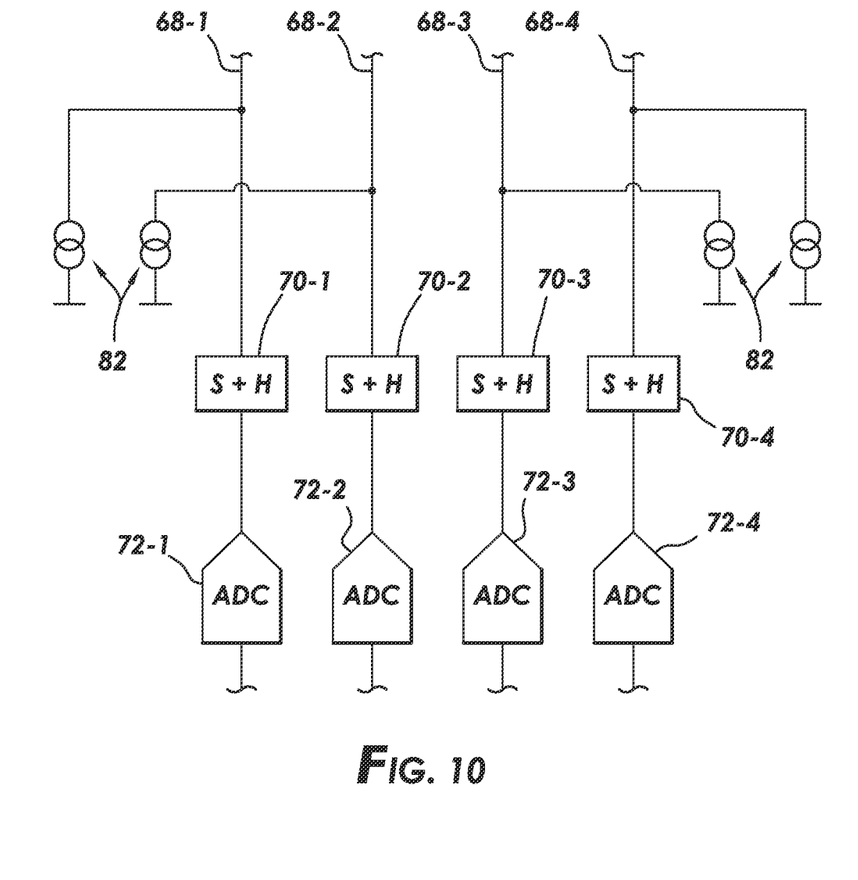
FIG. 10 is a diagram of an illustrative image sensor where a group of column output lines for a single column of imaging pixels has one sample and hold circuit per column output line and has one analog-to-digital converter per column output line in accordance with some embodiments.

In another possible arrangement, shown in FIG. 10, column output lines 68-1, 68-2, 68-3, and 68-4 each have dedicated sample and hold circuits and dedicated ADCs. Column output line circuitry 68-1 is connected to sample and hold circuit 70-1, column output line circuitry 68-2 is connected to sample and hold circuit 70-2, column output line circuitry 68-3 is connected to sample and hold circuit 70-3, and column output line circuitry 68-4 is connected to sample and hold circuit 70-4.

Each sample and hold circuit is coupled to a respective analog-to-digital converter. Sample and hold circuit 70-1 is connected to ADC 72-1, sample and hold circuit 70-2 is connected to ADC 72-2, sample and hold circuit 70-3 is connected to ADC 72-3, and sample and hold circuit 70-4 is connected to ADC 72-4.

The arrangement of FIG. 10 may afford additional speed improvements relative to the arrangement of FIG. 8. In FIG. 10, the total readout time for the four column output lines in this example may be 8 microseconds (6 microseconds for parallel settling in the four column output lines, 1 microsecond for parallel sample and hold operations for the four column output lines, and 1 microsecond for parallel ADC operations for the four column output lines).

It is noted that the examples in FIGS. 3, 5, 8, and 10 of the readout path(s) including sample and hold circuit(s) and ADC(s) is merely illustrative. Additional functional components and/or circuitry such as amplifiers may be included if desired. The additional functional components may either be shared between the column output lines (as in FIG. 5) or dedicated to a single associated column output line (as in FIG. 10).

Moreover, the example of having four column output lines per column of imaging pixels is merely illustrative. In general, there may be any desired number of column output lines per column of imaging pixels such as more than one, two, more than two, three, four, five, six, seven eight, more than eight, etc.

Figure 11:
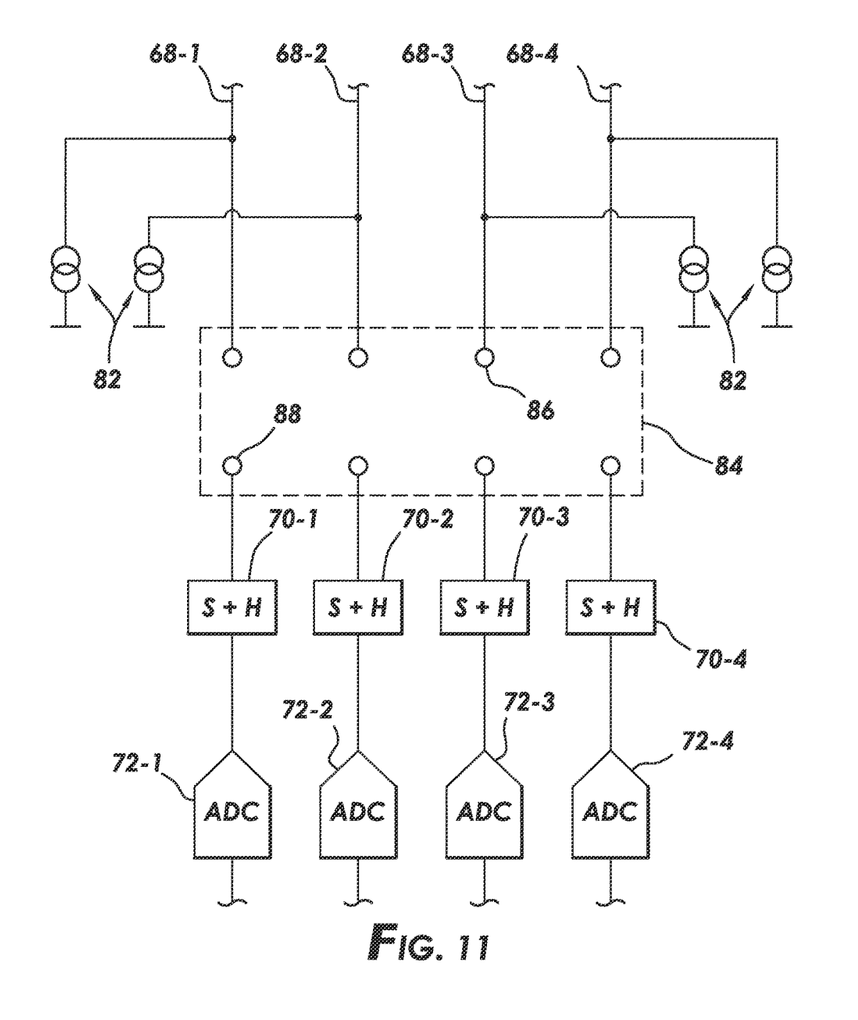
FIG. 11 is a diagram of an illustrative image sensor where a group of column output lines for a single column of imaging pixels has one sample and hold circuit per column output line, one analog-to-digital converter per column output line, and a multiplexer in accordance with some embodiments.

If desired, the readout circuitry of FIG. 10 may have an additional multiplexer. The readout circuitry in FIG. 11 is the same as in FIG. 10 except for an additional multiplexer 84 is included between the column output lines 68-1, 68-2, 68-3, and 68-4 and the sample and hold circuits 70-1, 70-2, 70-3, and 70-4. The multiplexer 84 may have first terminals 86 connected to column output lines 68-1, 68-2, 68-3, and 68-4 and second terminals 88 connected to sample and hold circuits 70-1, 70-2, 70-3, and 70-4. The multiplexer is configured to connect the four terminals 86 to the four terminals 88 in any combination. This provides additional flexibility for the readout operations of image sensor 14. For example, if desired, a voltage on a single column output line may be read through multiple readout paths (in parallel or in series) to mitigate noise. Additionally, the arrangement of FIG. 11 provides redundancy in the readout circuitry. Should a component in one readout path fail, another readout path may be used in its place.

Figure 12:
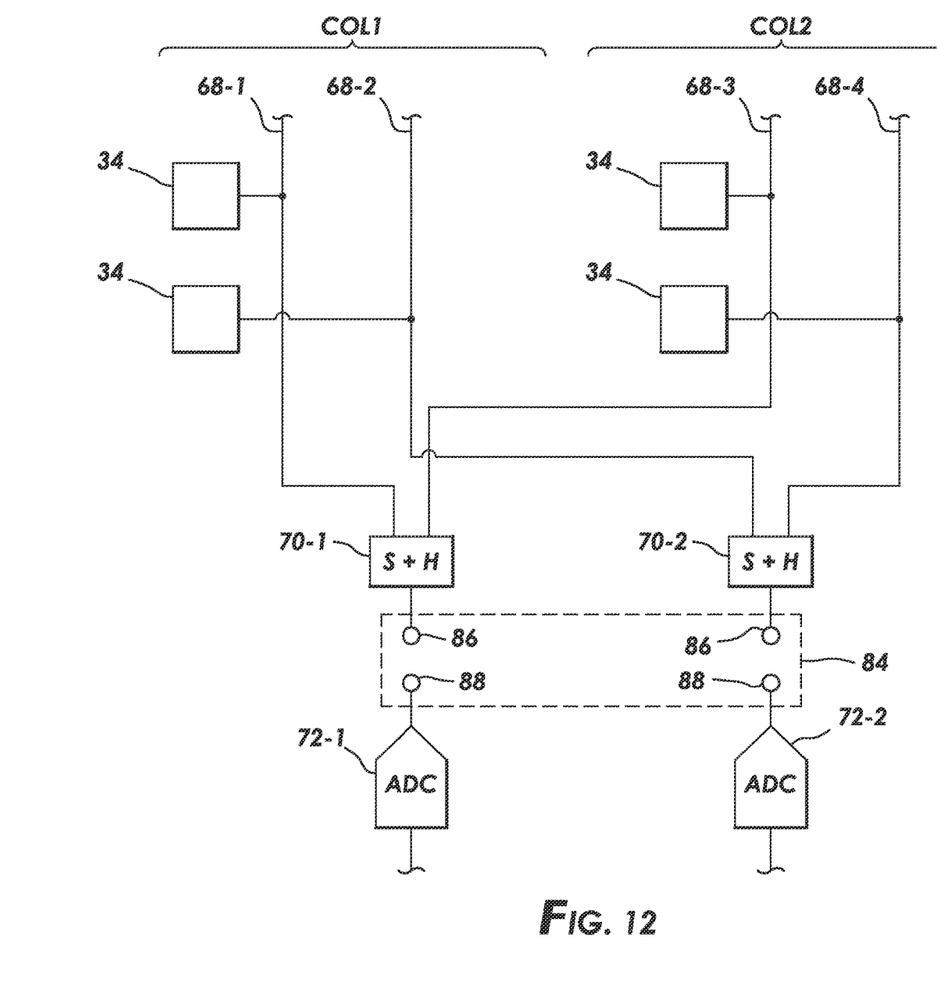
FIG. 12 is a diagram of an illustrative image sensor where each column of imaging pixels has multiple column output lines and readout circuitry is shared between columns of the imaging pixels in accordance with some embodiments.

In another possible arrangement, shown in FIG. 12, readout components may be shared between different columns of imaging pixels. In the example of FIG. 12, each column of imaging pixels has two associated column output lines. The first column of imaging pixels includes column output lines 68-1 and 68-2 whereas the second column of imaging pixels includes column output lines 68-3 and 68-4. Each one of the column output lines may be coupled to every other row of pixels, as one example.

Each column of imaging pixels includes one associated sample and hold circuit and one associated ADC. As shown, the first column of imaging pixels includes sample and hold circuit 70-1 and ADC 72-1 whereas the second column of imaging pixels includes sample and hold circuit 70-2 and ADC 72-2.

Column output line 68-1 is coupled to sample and hold circuitry 70-1. Column output line 68-2 is coupled to sample and hold circuitry 70-2. Column output line 68-3 is coupled to sample and hold circuitry 70-1. Column output line 68-4 is coupled to sample and hold circuitry 70-2.

Each one of sample and hold circuits 70-1 and 70-2 is coupled to multiplexer 84. Multiplexer 84 may selectively connect terminals 86 (which are connected to sample and hold circuitry) to terminals 88 (which are connected to ADCs 72-1 and 72-2). For example, multiplexer 84 may selectively route the signal from sample and hold circuit 70-1 to ADC 72-1 in a first state and to ADC 72-2 in a second, different state. Multiplexer 84 may selectively route the signal from sample and hold circuit 70-2 to ADC 72-1 in a first state and to ADC 72-2 in a second, different state.

The arrangement of FIG. 12 provides redundancy that allows for the masking of defective readout components.

In another possible arrangement, each one of column output lines 68-1 and 68-2 may be coupled to every imaging pixel in an associated column. This may allow for parallel readout from the same pixel (e.g., one readout through column output line 68-1 and one readout through column output line 68-2 for the same pixel). This may allow for improved dynamic range (e.g., by applying different gain settings to the two parallel readouts).

The foregoing is merely illustrative and various modifications can be made to the described embodiments. The foregoing embodiments may be implemented individually or in any combination.

What is claimed is:

1. An image sensor, comprising:
   an array of imaging pixels arranged in rows and columns, wherein each column of imaging pixels comprises:
      a plurality of analog column output lines, wherein each one of the plurality of analog column output lines is coupled to a respective subset of the imaging pixels in that column of imaging pixels; and
      readout circuitry coupled to the plurality of analog column output lines, wherein, for each column of imaging pixels, the readout circuitry comprises:
      a sample and hold circuit, and
      an analog-to-digital converter.

2. The image sensor defined in claim 1, wherein, for each column of imaging pixels, the plurality of analog column output lines is coupled to the imaging pixels in that column of imaging pixels in an alternating manner.

3. The image sensor defined in claim 1, wherein, for each column of imaging pixels, the plurality of analog column output lines includes a first analog column output line coupled to a first row of the imaging pixels, a second analog column output line coupled to a second row of the imaging pixels, a third analog column output line coupled to a third row of the imaging pixels, and a fourth analog column output line coupled to a fourth row of the imaging pixels and wherein the first, second, third, and fourth rows of the imaging pixels are adjacent.

4. The image sensor defined in claim 3, wherein, for each column of imaging pixels, the first analog column output line is coupled to a fifth row of the imaging pixels, the second analog column output line is coupled to a sixth row of the imaging pixels, the third analog column output line is coupled to a seventh row of the imaging pixels, and the fourth analog column output line is coupled to an eighth row of the imaging pixels and wherein the fifth, sixth, seventh, and eighth rows of the imaging pixels are adjacent.

5. The image sensor defined in claim 3, wherein, for each column of imaging pixels, the first analog column output line is coupled to every fourth row of imaging pixels, the second analog column output line is coupled to every fourth row of imaging pixels, the third analog column output line is coupled to every fourth row of imaging pixels, and the fourth analog column output line is coupled to every fourth row of imaging pixels.

6. The image sensor defined in claim 1, wherein, for each column of imaging pixels, the readout circuitry further comprises:
   a multiplexer that is interposed between the plurality of analog column output lines and the sample and hold circuit.

7. The image sensor defined in claim 6, wherein the multiplexer is configured to connect a first analog column output line of the plurality of analog column output lines to the sample and hold circuit in a first state and wherein the multiplexer is configured to connect a second analog column output line of the plurality of analog column output lines to the sample and hold circuit in a second state that is different than the first state.

8. The image sensor defined in claim 1, wherein, for each column of imaging pixels, the analog-to-digital converter is a single analog-to-digital converter, and wherein, for each column of imaging pixels, the sample and hold circuit is one of a plurality of sample and hold circuits, each sample and hold circuit being connected to a respective one of the plurality of analog column output lines, and wherein, for each column of imaging pixels, the readout circuitry further comprises:
   a multiplexer connected between the plurality of sample and hold circuits and the single analog-to-digital converter.

9. The image sensor defined in claim 8, wherein the multiplexer is configured to connect a first sample and hold circuit of the plurality of sample and hold circuits to the single analog-to-digital converter in a first state and wherein the multiplexer is configured to connect a second sample and hold circuit of the plurality of sample and hold circuits to the single analog-to-digital converter in a second state that is different than the first state.

10. The image sensor defined in claim 1, wherein, for each column of imaging pixels, the sample and hold circuit is one of a plurality of sample and hold circuits, wherein each sample and hold circuit is connected to a respective one of the plurality of analog column output lines, and wherein, for each column of imaging pixels, the analog-to-digital converter is one of a plurality of analog-to-digital converters, wherein each analog-to-digital converter is connected to a respective one of the sample and hold circuits.

11. The image sensor defined in claim 10, wherein, for each column of imaging pixels, the readout circuitry further comprises:
   a multiplexer that selectively connects the plurality of analog column output lines to the plurality of sample and hold circuits.

12. The image sensor defined in claim 1, wherein, for each respective column of imaging pixels, the sample and hold circuit for the respective column of imaging pixels is connected between the respective column of imaging pixels and the analog-to-digital converter for the respective column of imaging pixels.

13. An image sensor, comprising:
   an array of imaging pixels arranged in rows and columns; and
   a plurality of groups of analog column output lines, wherein:
      each group of analog column output lines includes at least two analog column output lines and is associated with a single column of the columns,
      a first analog column output line of the at least two analog column output lines is configured to provide output voltages associated with a first subset of the rows in a respective column,
      a second analog column output line of the at least two analog column output lines is configured to provide output voltages associated with a second subset of the rows in the respective column, the first analog column output line is configured to sample a first analog reset sample during a first time frame, the second analog column output line is configured to sample a second analog reset sample during a second time frame that is different from the first time frame and that partially overlaps the first time frame, the first analog column output line is configured to sample a first analog signal sample during a third time frame that is different from the first and second time frames and that partially overlaps the second time frame, and the second analog column output line is configured to sample a second analog signal sample during a fourth time frame that is different from the first, second, and third time frames and that partially overlaps the third time frame.

14. The image sensor defined in claim 13, wherein the first subset of the rows alternates with the second subset of the rows.

15. The image sensor defined in claim 13, wherein a third analog column output line of the at least two analog column output lines is configured to provide output voltages associated with a third subset of the rows in the respective column, wherein a fourth analog column output line of the at least two analog column output lines is configured to provide output voltages associated with a fourth subset of the rows in the respective column, and wherein the first, second, third, and fourth subsets of the rows are alternating.

16. The image sensor defined in claim 13, wherein each group of analog column output lines shares a single respective sample and hold circuit and a single respective analog-to-digital converter.

17. The image sensor defined in claim 13, wherein each group of analog column output lines has one sample and hold circuit per analog column output line and wherein each group of analog column output lines shares a single respective analog-to-digital converter.

18. The image sensor defined in claim 13, wherein each group of analog column output lines has one sample and hold circuit per analog column output line and has one analog-to-digital converter per analog column output line.

19. An image sensor, comprising:
an array of imaging pixels arranged in rows and columns, wherein the columns include a first column and a second column;
a first column output line that is coupled to at least some of the imaging pixels in the first column;
a second column output line that is coupled to at least some of the imaging pixels in the first column;
a third column output line that is coupled to at least some of the imaging pixels in the second column;
a fourth column output line that is coupled to at least some of the imaging pixels in the second column;
a first sample and hold circuit that is connected to the first column output line and the third column output line; and
a second sample and hold circuit that is connected to the second column output line and the fourth column output line.

20. The image sensor defined in claim 19, further comprising:
first and second analog-to-digital converters; and
a multiplexer configured to selectively connect the first and second sample and hold circuits to the first and second analog-to-digital converters.

* * * * *